(12) United States Patent
Lee et al.

(10) Patent No.: US 9,054,747 B2
(45) Date of Patent: Jun. 9, 2015

(54) MOBILE TERMINAL AND POWER CONTROL METHOD THEREOF (71) Applicant: LG INNOTEK CO., LTD., Seoul (KR)

(72) Inventors: Jung Oh Lee, Seoul (KR); Ki Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 85 days.

(21) Appl. No.: 13/836,183

(22) Filed: Mar. 15, 2013

(65) Prior Publication Data

US 2013/0252676 A1 Sep. 26, 2013

(30) Foreign Application Priority Data

Mar. 26, 2012 (KR) .......................... 10-2012-0030801
May 4, 2012 (KR) .......................... 10-2012-0047731

(51) Int. Cl.
H04M 1/00 (2006.01)
H04B 1/38 (2006.01)
H04B 5/00 (2006.01)

(52) U.S. Cl.
CPC .................................... H04B 5/0037 (2013.01)

(58) Field of Classification Search
None
See application file for complete search history.

(56) References Cited

U.S. PATENT DOCUMENTS

| 6,002,763 | A * | 12/1999 | Lester et al. | 379/421 |
| 7,893,564 | B2 * | 2/2011 | Bennett | 307/104 |
| 2005/0219120 | A1 * | 10/2005 | Chang | 342/357.13 |
| 2008/0211455 | A1 * | 9/2008 | Park et al. | 320/108 |
| 2010/0320962 | A1 | 12/2010 | Sekita et al. | |
| 2011/0127954 | A1 * | 6/2011 | Walley et al. | 320/108 |
| 2011/0278945 | A1 | 11/2011 | Wheatley, III et al. | |
| 2011/0316475 | A1 * | 12/2011 | Jung et al. | 320/108 |
| 2012/0038317 | A1 | 2/2012 | Miyamoto et al. | |
| 2012/0050015 | A1 | 3/2012 | Low et al. | |
| 2012/0153894 | A1 * | 6/2012 | Widmer | 320/108 |
| 2012/0164943 | A1 | 6/2012 | Bennett | |
| 2012/0214462 | A1 * | 8/2012 | Chu et al. | 455/418 |
| 2012/0295634 | A1 * | 11/2012 | Kim | 455/456.1 |
| 2013/0117552 | A1 | 5/2013 | Kim | |

FOREIGN PATENT DOCUMENTS

| CN | 10-1931250 A | 12/2010 |
| CN | 10-2377224 A | 3/2012 |
| JP | 2011-120410 A | 6/2011 |
| KR | 10-2006-0032334 A | 4/2006 |
| KR | 10-2010-0017073 A | 2/2010 |
| KR | 10-2010-0101470 A | 9/2010 |
| KR | 10-2011-0135539 A | 12/2011 |
| KR | 10-2011-0139838 A | 12/2011 |

(Continued)

OTHER PUBLICATIONS

Office Action dated Oct. 28, 2014 in Chinese Application No. 201310099580.

(Continued)

Primary Examiner — Magdi Elhag
(74) Attorney, Agent, or Firm — Saliwanchik, Lloyd & Eisenschenk (57) ABSTRACT Disclosed is a mobile terminal. The mobile terminal includes a receiving unit to wirelessly receive power from a wireless power transmitter; and a sensing unit to sense a call signal, wherein, when the call signal is sensed, the mobile terminal transmits a transmission power control signal for controlling transmission power of the wireless power transmitter to the wireless power transmitter.

14 Claims, 7 Drawing Sheets (56) References Cited

FOREIGN PATENT DOCUMENTS

| KR | 10-2012-0009628 A | 2/2012 |
| WO | WO-2011/143539 A1 | 11/2011 |

OTHER PUBLICATIONS

European Search Report dated Feb. 18, 2015 in European Application No. 13160224.5.

* cited by examiner

MOBILE TERMINAL AND POWER CONTROL METHOD THEREOF

CROSS-REFERENCE TO RELATED APPLICATIONS

This application claims the benefit under 35 U.S.C. §119 of Korean Patent Application Nos. 10-2012-0030801, filed Mar. 26, 2012 and 10-2012-0047731, filed May 4, 2012, which are hereby incorporated by reference in their entirety.

BACKGROUND

The disclosure relates to a wireless power transmission technology. In more particular, the disclosure relates to a mobile terminal capable of wirelessly receiving power by using the wireless power transmission technology, and a power control method thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmitting technologies, an energy transmitting scheme employing resonance has been widely used.

In a wireless power transmission system employing resonance, since an electrical signal generated between the wireless power transmitter and the wireless power receiver is wirelessly transferred through coils, a user may easily charge electronic appliances such as a portable device.

Recently, the wireless power transmission system has been applied to a mobile terminal such as a portable phone.

However, when a call signal is received in the mobile terminal of the related art during a wireless power transmission process, communication jamming is caused by the magnetic field generated during a power transmission so that reception sensitivity is deteriorated.

BRIEF SUMMARY

The disclosure provides a mobile terminal capable of controlling the power transmitted to a wireless power receiver when the mobile terminal receives a call signal while the mobile terminal is wirelessly receiving the power, and a power control method thereof.

The disclosure provides a mobile terminal capable of blocking the power transmitted to a wireless power receiver when the mobile terminal receives a call signal while the mobile terminal is wirelessly receiving the power, and a power control method thereof.

The disclosure provides a mobile terminal capable of resuming the power transmission to a wireless power receiver when reception sensitivity is equal to or more than threshold sensitivity as the mobile terminal enters a call mode, and a power control method thereof.

According to one embodiment, there is provided a mobile terminal including a receiving unit to wirelessly receive power from a wireless power transmitter; and a sensing unit to sense a call signal, wherein, when the call signal is sensed, the mobile terminal transmits a transmission power control signal for controlling transmission power of the wireless power transmitter to the wireless power transmitter.

According to one embodiment, there is provided a wireless power transmitter which wirelessly transmits power to a mobile terminal including a wireless power receiver. The wireless power transmitter includes a power supplying apparatus to generate AC power; and a transmission coil to wirelessly transmit the AC power to the mobile terminal, wherein the wireless power transmitter adjusts transmission power of the wireless power transmitter, when information about a call is received from the mobile terminal.

The embodiments have the following effects.

First, when the mobile terminal receives a call signal while the mobile terminal is wirelessly receiving the power, the power transmitted to the wireless power receiver can be controlled, so that reception sensitivity can be inhibited from being deteriorated.

Second, when the mobile terminal receives a call signal while the mobile terminal is wirelessly receiving the power, the power transmitted to the wireless power receiver can be blocked so that reception sensitivity can be inhibited from being deteriorated.

Third, when reception sensitivity is equal to or more than threshold sensitivity as the mobile terminal enters a call mode, the power transmission to the wireless power receiver is resumed, so that a battery of a mobile terminal can be charged even during a call.

Meanwhile, any other various effects will be directly and implicitly described below in the description of the embodiment.

DETAILED DESCRIPTION

Hereinafter, the exemplary embodiments will be described with reference to accompanying drawings in detail so that those skilled in the art can easily realize the embodiments.

Figure 1:
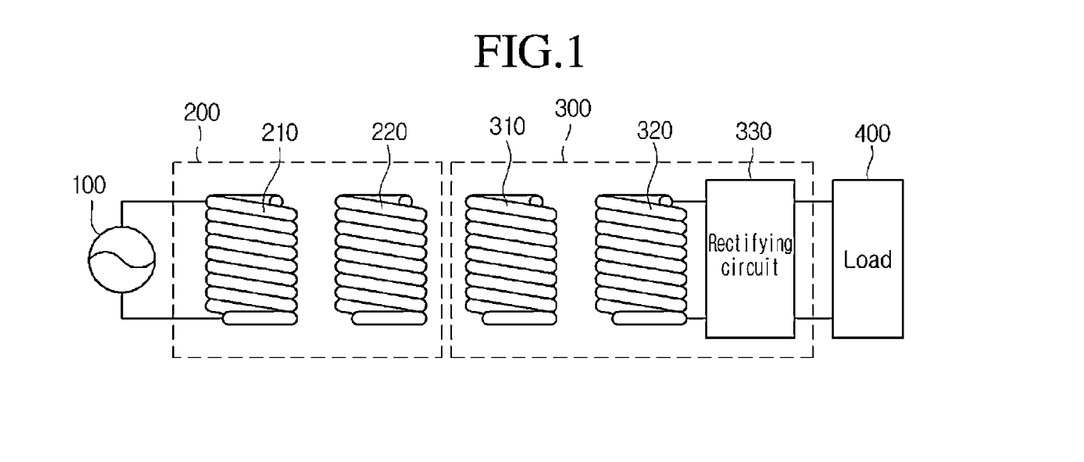
FIG. 1 is a view showing a wireless power transmission system according to one embodiment.

FIG. 1 a circuit diagram showing a resonance-type wireless power transmission system 1000 according to the embodiment.

Referring to FIG. 1, the wireless power transmission system 1000 may include a power supply device 100, a wireless power transmitter 200, a wireless power receiver 300 and a load side 400.

According to one embodiment, the power supply device 100 may be included in the wireless power transmitter 200.

The wireless power transmitter 200 may include a transmission induction coil 210 and a transmission resonant coil 220.

The wireless power receiver 300 may include a reception resonant coil 310, a reception induction coil 320, a rectifying circuit 330, and a load 400.

Both terminals of the power supply device 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying circuit 330, and the load 400 is connected to both terminals of the rectifying circuit 330. According to one embodiment, the load 400 may be included in the wireless power receiver 300.

The power generated from the power supply device 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supply device 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 due to the electromagnetic induction.

Thereafter, the power received in the transmission resonant coil 220 may be transmitted to the wireless power receiver 300, which makes a resonance circuit with the wireless power transmitter 200, through resonance.

Power can be transmitted between two LC circuits, which are impedance-matched with each other, through resonance. The power transmitted through the resonance can be farther transmitted with higher efficiency when comparing with the power transmitted by the electromagnetic induction.

The reception resonant coil 310 receives power from the transmission resonant coil 220 through the resonance. The AC current flows through the reception resonant coil 310 due to the received power. The power received in the reception resonant coil 310 may be transmitted to the reception induction coil 320, which is inductively coupled with the reception resonant coil 310, due to the electromagnetic induction. The power received in the reception induction coil 320 may be rectified by the rectifying circuit 330 and transmitted to the load 400.

The transmission resonant coil 220 of the wireless power transmitter 200 may transmit power to the reception resonant coil 310 of the wireless power receiver 300 through a magnetic field.

In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission.

The quality factor may refer to an index of energy that may be stored in the vicinity of the wireless power transmitter 200 or the wireless power receiver 300.

The quality factor may vary according to the operating frequency $\omega$ as well as a shape, a dimension and a material of a coil. The quality factor may be expressed as following equation, $Q=\omega*L/R$. In the above equation, L refers to the inductance of a coil and R refers to resistance corresponding to the quantity of power loss caused in the coil.

The quality factor may have a value of 0 to infinity.

The coupling coefficient represents the degree of inductive magnetic coupling between a transmission coil and a reception coil, and has a value of 0 to 1.

The coupling coefficient may vary according to the relative position and the distance between the transmission coil and the reception coil.

Figure 2:
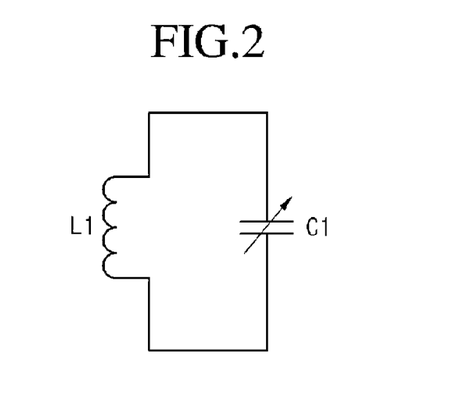
FIG. 2 is a circuit diagram showing an equivalent circuit diagram of a transmission induction coil according to one embodiment.

FIG. 2 is a circuit diagram showing an equivalent circuit of the transmission induction coil 210 according to one embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuit of the transmission resonant coil 220, the reception resonant coil 310 and the reception induction coil 320 may be the same as the equivalent circuit shown in FIG. 2.

Figure 3:
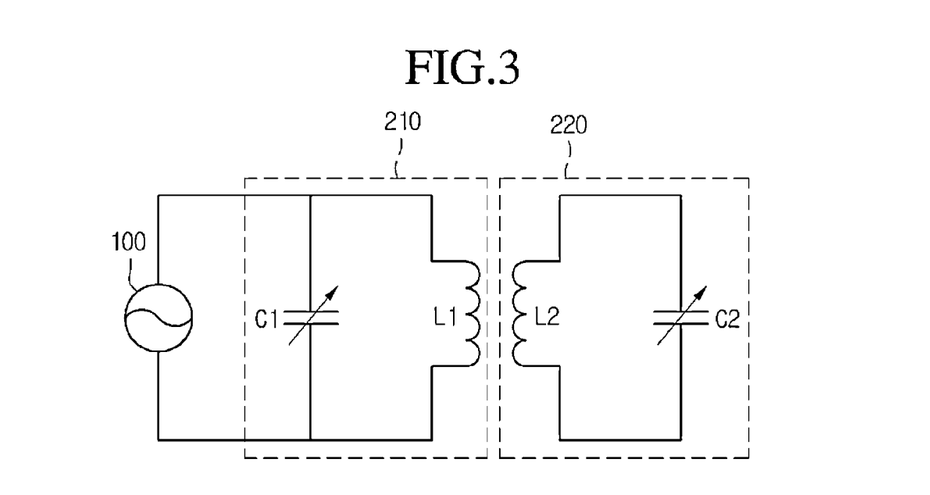
FIG. 3 is a circuit diagram showing an equivalent circuit of the power supply device and the wireless power transmitter according to one embodiment.

FIG. 3 is a circuit diagram showing an equivalent circuit of the power supply device 100 and the wireless power transmitter 200 according to one embodiment.

As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
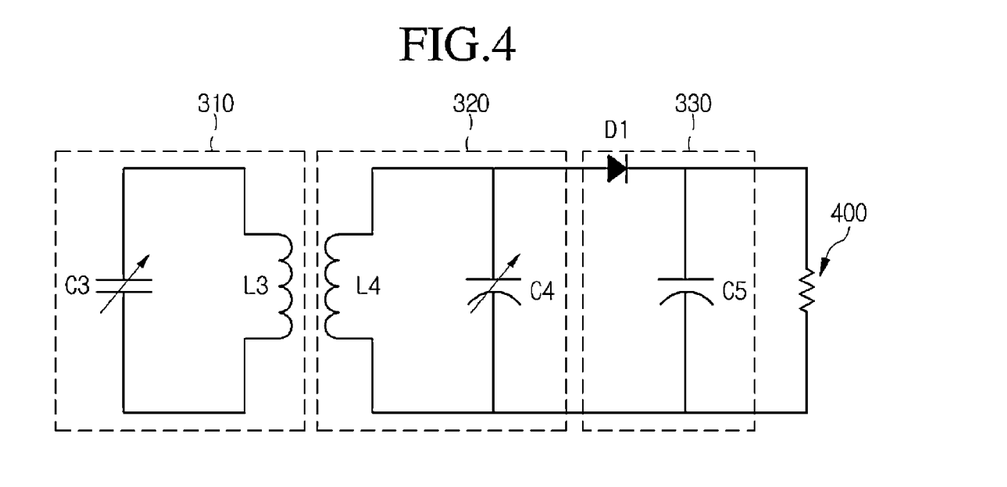
FIG. 4 is a circuit diagram showing an equivalent circuit of the wireless power receiver according to one embodiment.

FIG. 4 is a circuit diagram showing an equivalent circuit of the wireless power receiver 300 according to one embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying circuit 330 may include a diode D1 and a rectifying capacitor C5 and may output the DC power by converting the AC power into the DC power.

The rectifying circuit 330 may include a rectifier and a smoothing circuit. The rectifier may include a silicon rectifier as a rectifying device.

The smoothing circuit can output smooth DC power.

The load 400 may be a predetermined rechargeable battery or a device requiring the DC power. For example, the load 400 may refer to a battery.

The wireless power receiver 300 may be installed in an electronic device, such as a cellular phone, a laptop computer or a mouse, requiring the power.

Hereinafter, a method of controlling power transmission from the wireless power transmitter 200 to the wireless power receiver 300 according to the detection of a call signal will be described with reference to FIGS. 5 and 6.

Figure 5:
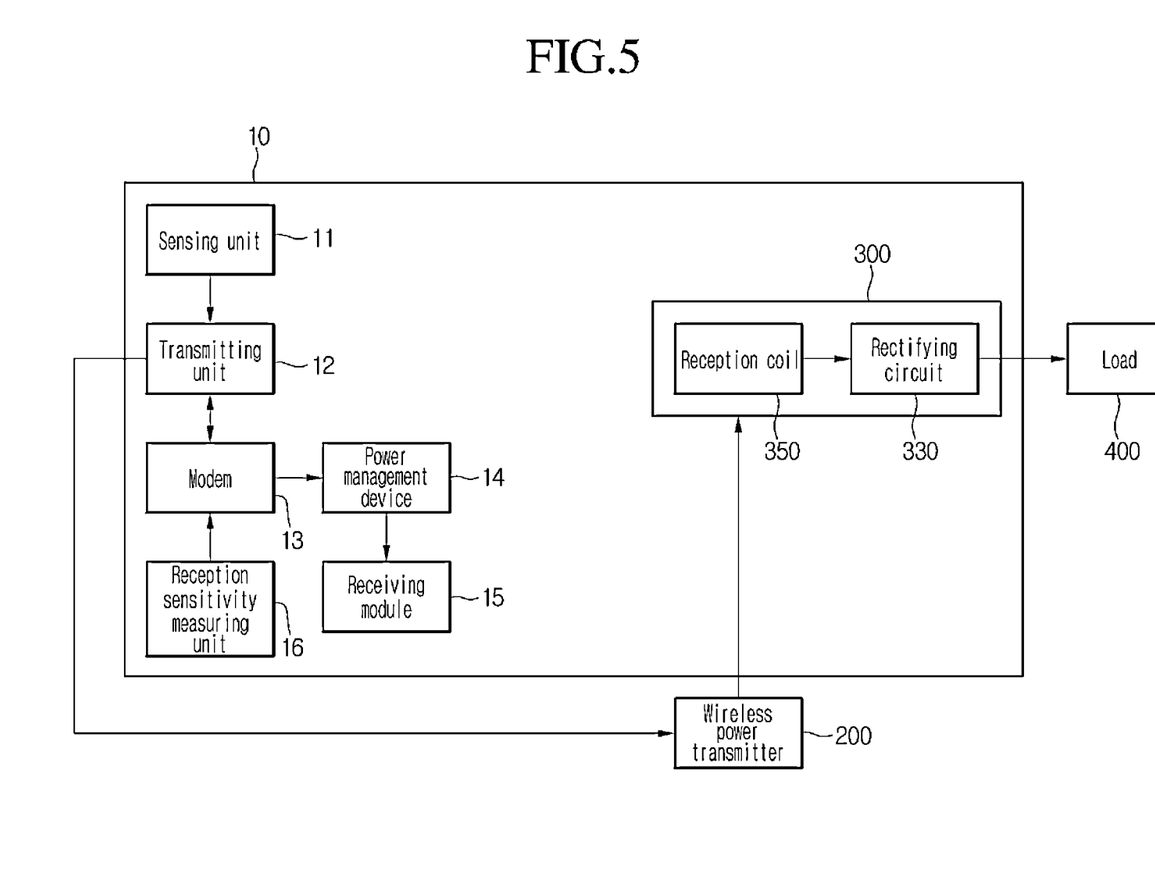
FIG. 5 is a block diagram showing a mobile terminal according to the first embodiment.

FIG. 5 is a block diagram showing a mobile terminal 10 according to the first embodiment.

Referring to FIG. 5, the mobile terminal 10 may include a sensing unit 11, a transmitting unit 12, a modem 13, a power management device 14, a receiving module 15, a reception sensitivity measuring unit 16, and a wireless power receiver 300.

The sensing unit 11 may sense a call signal for allowing the mobile terminal 10 to enter a call mode by receiving the call signal from a base state.

When the mobile terminal 10 is in not the call mode but a sleep mode, the sensing unit 11 may communicate with the base state every a predetermined time and may stand by to receive a call signal. The sleep mode may be called a non-call mode.

When the sensing unit 11 senses a call signal, the transmitting unit 12 may generate a power control signal for controlling the power transferred to the wireless power receiver 300 and may transmit the power control signal to the wireless power transmitter 200.

In the embodiment, the power control signal may include a power blocking signal, a power resuming signal, a power reducing signal, and a power maintaining signal. According to the embodiment, the power blocking signal may signify a signal that blocks the power transmitted to the wireless power receiver 300 such that the power is not received in the wireless power receiver 300. According to the embodiment, the power resuming signal may signify a signal enabling the wireless power receiver 300 to receive the power from the wireless power transmitter 200 from the state where the power is not transmitted from the wireless power transmitter 200 to the wireless power receiver 300. According to the embodiment, the power resuming signal may signify a signal that resumes the power transmission to the wireless power receiver 300 when reception sensitivity, which will be described below, is threshold sensitivity or more in a call mode. According to the embodiment, the power reducing signal may signify a signal that reduces the transmission power of the wireless power transmitter 200. According to the embodiment, the power holding signal may signify a signal that holds the power transmitted to the wireless power receiver 300.

The transmitting unit 12 may transmit the power control signal to the wireless power transmitter 200.

When the transmitting unit 12 senses the call signal, the transmitting unit 12 transmits the power blocking signal to the wireless power transmitter 200 such that the power transmitted to the wireless power receiver 300 may be blocked. When the call signal is sensed so that the mobile terminal 10 enters the call mode while the power is being transmitted from the wireless power transmitter 200 to the wireless power receiver 300, since the reception sensitivity is deteriorated, the transmitting unit 12 transmits the power blocking signal to the wireless power transmitter 200 such that the power transmitted to the wireless power receiver 300 is blocked, so the reception sensitivity can be inhibited from being deteriorated. Actually, if the call signal is sensed upon the wireless power transmission, the reception sensitivity in the call mode is reduced by about 8 dB. The 8 dB is illustrative purpose only.

According to the embodiment, if the power transmitted from the wireless power transmitter 200 to the wireless power receiver 300 is blocked when the mobile terminal 10 enters the call mode, the reception sensitivity of the call is inhibited from be deteriorated, so that the displeasure of a user may be reduced.

The transmitting unit 12 may include a module that makes possible to allow wireless communication between the mobile terminal 10 and a wireless communication system, the mobile terminal 10 and a network in which the mobile terminal 10 is located, or the mobile terminal 10 and the wireless power transmitter 200.

The transmitting unit 12 may exchange information with the wireless power transmitter 200 through out-of-band communication. The out-of-band communication may signify that information is exchanged between the wireless power transmitter 200 and the wireless power receiver 300 by using a signal having a frequency except for the frequency used for wireless power transmission.

To this end, the transmitting unit 12 may include a short range communication module.

The short range communication module refers to a module for short range communication. Bluetooth, RFID (Radio Frequency Identification), IrDA (infrared Data Association), UWB (Ultra Wideband), ZigBee, or NFC (Near Field Communication) may be used as the short range communication technique.

The transmitting unit 12 may adjust the power transmission to the wireless power receiver 300 in communication with the wireless power transmitter 200 by using one of the short range communication modules. In this case, the wireless power transmitter 200 may include the short range communication module described above.

If the call signal is sensed by the sensing unit 11, the transmitting unit 12 may transmit a sensing signal informing the fact that the call signal is sensed to the modem 13. When the modem 13 receives the sensing signal, the modem 13 may generate a wake up signal and may transmit the wake up signal to the power management device 14. The wake up signal may signify a signal that allows the power management device 14 to provide power to the receiving module 15 such that the mobile terminal 10 normally maintains the call mode. Meanwhile, even if the modem 13 receives the sensing signal, when a call refusing signal that refuses to enter the call mode is received or a call starting instruction is not received from a user, the modem 13 may not transmit the wake up signal to the power management device 14.

After the power management device 14 receives the wake up signal from the modem 13 and enters the wake up state, the power management device 14 may provide the power to the receiving module 15. That is, when the mobile terminal 10 enters the call mode, the power management device 14 may provide the power necessary to initiated and maintain the call mode to the receiving module 15.

The mobile terminal 10 may transmit the power control signal to the wireless power transmitter 200 based on the wake up signal. When the mobile terminal 10 senses the wake up signal generated from the modem 13, the mobile terminal 10 may transmit the power control signal to the wireless power transmitter 200 by using the wake up signal as an interruption signal.

That is, the wake up signal may be used as the basis of the time point when the mobile terminal 10 transmits the power control signal to the wireless power transmitter 200.

According to the embodiment, before the mobile terminal 10 transmits the wake up signal to the power management device 14, the mobile terminal 10 may transmit the power control signal to the wireless power transmitter 200. In detail, before the mobile terminal 10 transmits the wake up signal to the power management device 14, the mobile terminal 10 may transmit the power blocking signal to the wireless power transmitter 200. Meanwhile, when the mobile terminal 10 receives the call refusing instruction from the user before the mobile terminal 10 transmits the wake up signal to the power management device 14, the mobile terminal 10 may not transmit the power blocking signal to the wireless power transmitter 200. In this case, even if the mobile terminal 10 senses the call signal, the mobile terminal 10 may continuously receive the power from the wireless power transmitter 200.

According to the embodiment, the receiving module 15 may include a media input unit, a user input unit, a sensor, an output unit and a power amplifier.

The media input unit may include a camera and a microphone for the purpose of inputting an audio or video signal.

The user input unit may receive input data for controlling an operation of the mobile terminal 10. Specifically, the mobile terminal 10 may receive the call starting instruction necessary to enter the call mode through the user input unit. That is, the user input unit may include a call button for allowing the mobile terminal 10 to enter the call mode. The mobile terminal 10 may receive the call starting instruction by selecting the call button.

Meanwhile, the mobile terminal 10 may transmit the power control signal to the wireless power transmitter 200 in a state of sensing the call signal the according to whether the call starting instruction is received. In detail, when the mobile terminal 10 receives the call starting instruction from the user, the mobile terminal 10 may transmit the power blocking signal to the wireless power transmitter 200 to block the power transmission, and when the mobile terminal 10 does not receive the call starting instruction from the user, the mobile terminal 10 may transmit the power maintaining signal to the wireless power transmitter 200 to maintain the power transmission. That is, even if the call signal is sensed, the mobile terminal 10 may control the transmission power of the wireless power transmitter 200 according to whether the mobile terminal 10 enters the call mode. Thus, when a call signal is sensed, it is inhibited that the charging of the mobile terminal 10 is unconditionally stopped, so that the mobile terminal 10 may receive the power continuously and endlessly.

The sensor may generate the sensing signal for controlling the operation of the mobile terminal 10 by sensing a current state of the mobile terminal 10, such as an open or close state of the mobile terminal 10, a location of the mobile terminal 10, a contact by a user, a direction of the mobile terminal 10, or an acceleration or deceleration of the mobile terminal 10.

The output unit generates outputs related to sight, hearing or touch of a user, and thus, may include a display unit, a sound output module, and an alarm unit.

The display unit displays information processed by the mobile terminal 10. For example, when the mobile terminal 10 is in the call mode, the display unit displays an UI (User Interface) or a GUI (Graphic User Interface) related to a call.

The sound output module may output audio data received from a communication unit and stored in a memory in a call signal receiving mode, a call mode, a recording mode, a voice recognition mode, or a broadcasting receiving mode. The sound output module may include a receiver, a speaker and a buzzer.

The alarm unit outputs a signal for informing a user of an event generation of the mobile terminal 10. For example, the event generated from the mobile terminal 10 includes a call signal reception, a message reception, a key signal input, and a touch input.

The power amplifier may amplify the power received from the power management device 14, and transfers the amplified power to an element such as the media input unit, the user input unit, the sensing unit, or the output unit.

When the mobile terminal 10 enters the call mode, the reception sensitivity measuring unit 16 may measure the reception sensitivity of a call and may transfer the measured reception sensitivity to the modem 13. When the reception sensitivity is equal to or more than the threshold sensitivity, the modem 13 may generate the power resuming signal and provide the power resuming signal to the transmitting unit 12. The transmitting unit 12 may transmit the power resuming signal to the wireless power transmitter 200 in the state that the wireless power transmission is stopped, such that the power transmission to the wireless power receiver 300 may be resumed.

According to the embodiment, the threshold sensitivity is a minimum sensitivity necessary to maintain the normal call mode when the mobile terminal 10 enters the call mode, that is, the threshold sensitivity may signify the minimum sensitivity that does not cause unpleasant feeling to the user. The threshold sensitivity may be set by a user or may be set as a predetermined value when the mobile terminal 10 is manufactured.

The wireless power receiver 300 may be detachably installed in the mobile terminal 10.

The wireless power receiver 300 may wirelessly receive power from the wireless power transmitter 200 and may transfer the power to the load 400.

The load 400 may signify a battery of the mobile terminal 10. The wireless power receiver 300 may include a reception coil 350 and a rectifying circuit 330.

As shown in FIG. 1, the reception coil 350 may include a reception resonant coil 310 and a reception induction coil 320.

If the wireless power receiver 300 receives power from the wireless power transmitter 200 through electromagnetic induction, the receive coil 35 may not include the reception resonant coil 310. In this case, the wireless power receiver 300 may receive the power from the transmission induction coil of the wireless power transmitter 20 through electromagnetic induction.

When the wireless power receiver 300 receives the power from the wireless power transmitter 200 by using resonance, the reception resonant coil may receive the power from the transmission resonant coil of the wireless power transmitter 200. The reception induction coil, which is inductively coupled with the reception resonant coil, may receive the power from the reception resonant coil through electromagnetic induction, and transfer the received power to the load 400 through the rectifying circuit 330.

If power is continuously transferred to the wireless power receiver 300 when the mobile terminal 10 receives a call signal and enters the call mode, the call reception sensitivity may be deteriorated. Thus, the transmitting unit 12 transmits the power blocking signal to the wireless power transmitter 200 so that the power transmitted to the wireless power receiver 300 may be blocked. Therefore, the deterioration of call reception sensitivity caused when entering the call mode may be inhibited.

Meanwhile, according to the embodiment, when the call signal is sensed in the state of transmitting the power and the reception sensitivity measured in the call mode is less than the threshold sensitivity, the mobile terminal 10 may transmit the power blocking signal to the wireless power transmitter 200. In detail, when the mobile terminal 10 enters in the call mode and the reception sensitivity is less than the threshold sensitivity in the state of receiving the power due to an external main cause, the mobile terminal 10 may transmit the power blocking signal for blocking the transmission power to the wireless power transmitter 200 so that the reception sensitivity may be inhibited from being degraded. That is, in the state that a call is busy, if the attenuation of the reception sensitivity does not occur, the mobile terminal 10 may be continuously charged. If the reception sensitivity is degraded, the transmission power is blocked so that the charging of the mobile terminal 10 may be stopped. As a result, the mobile terminal 10 may transmit the power control signal to the wireless power transmitter 200 only when the reception sensitivity is degraded.

If the reception sensitivity is equal to or more than the threshold sensitivity in the call mode in the state that the wireless power transmission is stopped, the transmitting unit 12 may resume the power transmission to the wireless power receiver 300, so that the battery of the mobile terminal 10 may be charged even if the mobile terminal 10 is in the call mode. Thus, the problem of ceasing a call due to a shortage of the battery charge may be solved.

Meanwhile, when the wireless power transmitter 200 receives information about a call from the mobile terminal 10, the wireless power transmitter 200 may adjust the transmission power and transmit the adjusted transmission power to the mobile terminal 10. The call information may include call signal sensing information, reception sensitivity information, call initiation information and call termination information.

The call signal sensing information may signify information notifying the wireless power transmitter 200 of the fact that the mobile terminal 10 senses a call signal.

The reception sensitivity information may signify information notifying whether the call reception sensitivity is less than the threshold sensitivity, or equal to or more than the threshold sensitivity when the mobile terminal 10 is in the call mode.

The call initiation information may signify information notifying that the mobile terminal 10 receives a call initiation instruction so that the mobile terminal 10 enters the call mode.

The call termination information may signify information notifying that the mobile terminal 10 receives a call termination instruction so that the mobile terminal 10 is out of the call mode.

According to the embodiment, when the wireless power transmitter 200 receives one of the call signal sensing information, the call initiation information and the reception sensitivity information from the mobile terminal 10, the mobile terminal 10 may block the transmission power transmitted to the mobile terminal 10.

According to another embodiment, when the wireless power transmitter 200 receives the call signal sensing information and the call initiation information from the mobile terminal 10, the wireless power transmitter 200 may block the transmission power transmitted to the mobile terminal 10. That is, when the wireless power transmitter 200 receives the call signal sensing information and does not receive the call initiation information from the mobile terminal 10, the wireless power transmitter 200 may not block the transmission power transmitted to the mobile terminal 10. Thus, as long as the mobile terminal 10 does not enter the call mode, the mobile terminal 10 may continuously receive power so that the charging operation is not interrupted.

According to another embodiment, when the wireless power transmitter 200 receives the call signal sensing information, the call initiation information and the reception sensitivity information, the wireless power transmitter 200 may resume power transmission if the call reception sensitivity checked through the reception sensitivity information is equal to or more than the threshold value. In the state of resuming the power transmission, when the checked call reception sensitivity is less than the threshold value, the wireless power transmitter 200 may block the power transmission to the wireless power receiver 300.

According to still another embodiment, when the wireless power transmitter 200 receives the call signal sensing information and the call initiation information, the wireless power transmitter 200 may block the power transmission. Then, when the wireless power transmitter 200 receives the call termination information in the state that the transmission power is blocked, the wireless power transmitter 200 may resume the power transmission to the wireless power receiver 300.

The wireless power transmitter 200 may receive information related to a call from the mobile terminal 10 through in-band or out-of-band communication.

Figure 6:
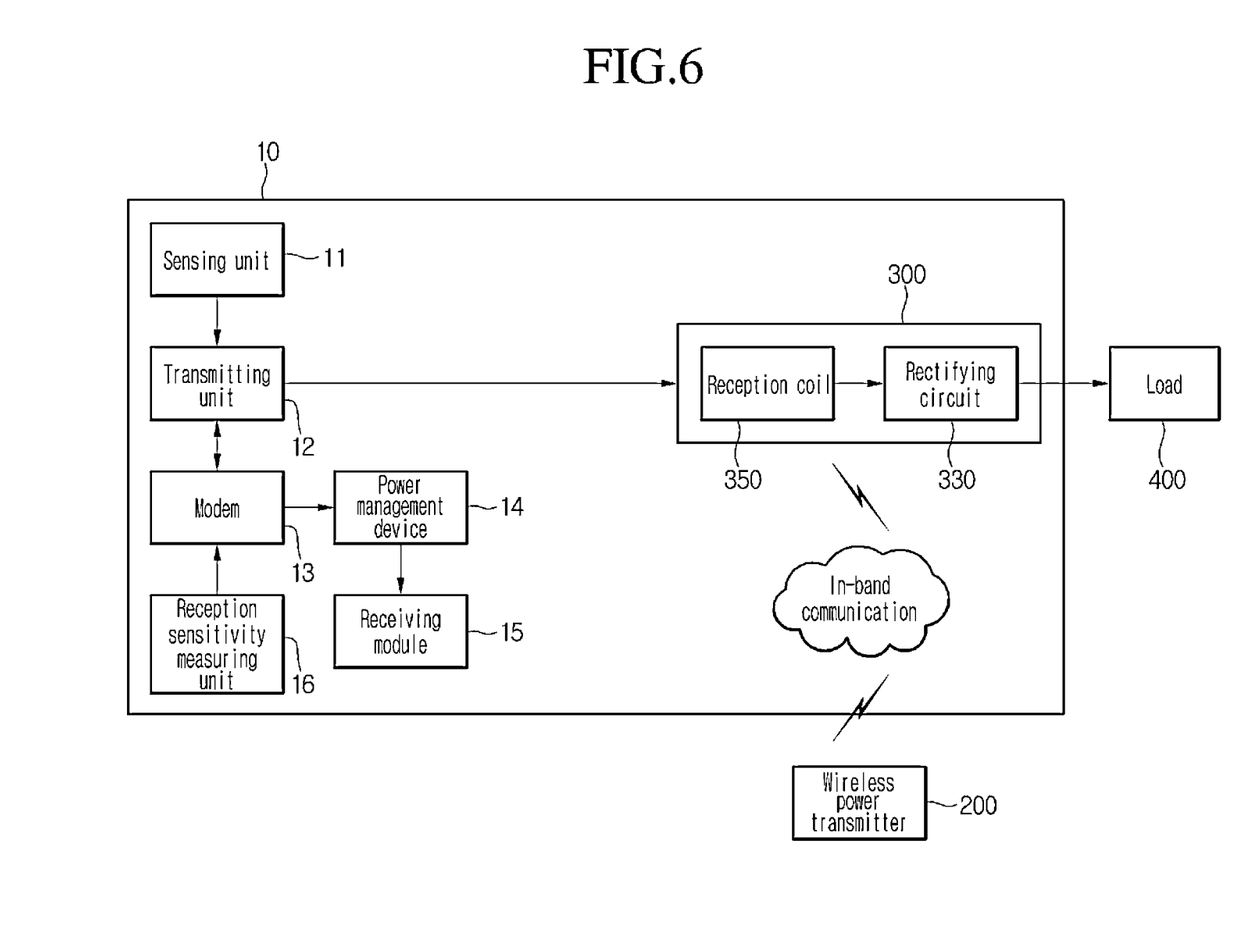
FIG. 6 is a block diagram showing a mobile terminal according to the second embodiment.

FIG. 6 is a block diagram showing a mobile terminal 10 according to the second embodiment.

Referring to FIG. 6, the mobile terminal 10 may include a sensing unit 11, a transmitting unit 12, a modem 13, a power management device 14, a receiving module 15, a reception sensitivity measuring unit 16, and a wireless power receiver 300.

Since the functions of the elements except for the transmitting unit 12 are the same as those described in FIG. 5, the detailed description will be omitted below.

When the sensing unit 12 senses a call signal, the transmitting unit 12 may transmit a sensing signal of informing of the call signal sensing to the wireless power receiver 300.

When the wireless power receiver 300 receives the sensing signal, the wireless power transmitter 200 may adjust the power transmitted to the wireless power receiver 300 in in-band communication with the wireless power transmitter 200.

The in-band communication may refer to the communication for exchanging information between the wireless power transmitter 200 and the wireless power receiver 300 by using a signal having a frequency used in the wireless power transmission. The wireless power receiver 300 may receive the power transmitted from the wireless power transmitter 200 through a switching operation or not.

In detail, the wireless power receiver 300 may change an amount of power absorbed in a resistor by using the resistor and a switch included in the wireless power receiver 300, so that the wireless power transmitter may change the power consumed in the wireless power transmitter 200. The wireless power transmitter 200 may sense a change of the consumed power to obtain state information about the wireless power receiver 300. The switch and the resistor may be connected in series to each other.

In more detail, when the switch is opened, the power absorbed in the resistor is 0 (zero) and the power consumed in the wireless power transmitter 200 is also reduced.

If the switch is shorted, the power absorbed in the resistor is more than 0 and the power consumed in the wireless power transmitter 200 is increased. While the wireless power receiver repeats the above operation, the wireless power transmitter 200 may detect the power consumed in the wireless power transmitter 200 and may perform digital communication with the wireless power receiver 300.

The wireless power transmitter 200 receives the information about the state of the wireless power receiver 300 according to the above operation, so that the wireless power transmitter 200 may transmit the power suitable to the reception state of the wireless power receiver 300.

To the contrary, by providing the resistor and the switch to the wireless power transmitter 200, it is possible to transmit the information about the state of the wireless power transmitter 200 to the wireless power receiver 300.

When the wireless power receiver 300 receives the sensing signal from the transmitting unit 12, the wireless power receiver 300 may transmit the power control signal for adjusting the power transmitted from the wireless power transmitter 200 to the wireless power transmitter 200. The wireless power receiver 300 may further include a control unit (not shown). The control unit (not shown) may receive the sensing signal so that the control unit may generate a power control signal.

According to the embodiment, the power control signal may include a power blocking signal and a power resuming signal. According to the embodiment, the power blocking signal may signify a signal that blocks the power transmitted to the wireless power receiver 300 such that the power is not received in the wireless power receiver 300. According to the embodiment, the power resuming signal may signify a signal enabling the wireless power receiver 300 to receive the power from the wireless power transmitter 200 from the state where the power is not transmitted from the wireless power transmitter 200 to the wireless power receiver 300. According to the embodiment, the power resuming signal may signify a signal that resumes the power transmission to the wireless power receiver 300 when reception sensitivity, which will be described below, is threshold sensitivity or more in a call mode.

Different from the embodiment in FIG. 5, it is possible to perform a power adjustment between the wireless power transmitter 200 and the wireless power receiver 300 by using in-band communication according to whether a call signal is sensed.

Figure 7:
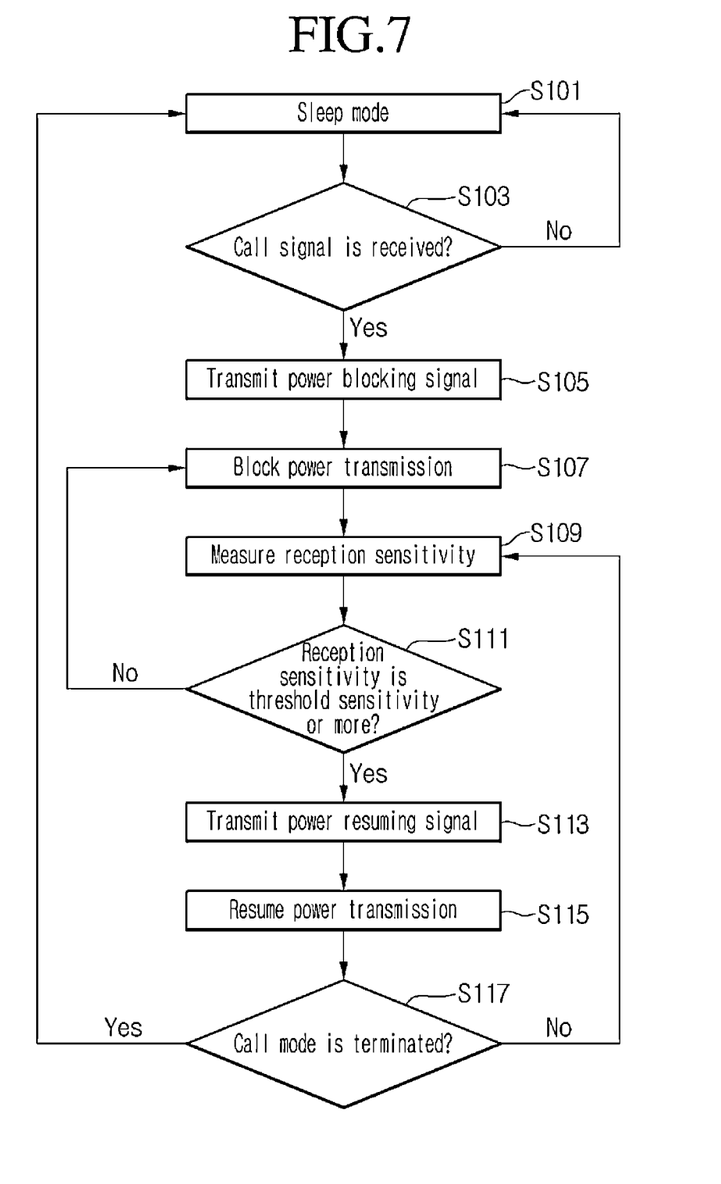
FIG. 7 is a flowchart illustrating a power transmitting scheme of the mobile terminal according to one embodiment.

FIG. 7 is a flowchart illustrating a power transmission method of the mobile terminal 10 according to the embodiment.

The mobile terminal 10 may include all of the elements described in FIG. 5.

First, in step S101, the mobile terminal 10 is in the sleep mode in which the mobile terminal 10 does not receive a call signal.

Then, in step S103, the sensing unit 11 senses the reception of the call signal. According to the embodiment, the sensing unit 11 may communicate periodically with a base station and may check whether a call signal is received.

When the call signal is sensed, the transmitting unit 12 may transmit the power blocking signal to the wireless power transmitter 200 in step S105. According to the embodiment, the transmitting unit 12 may generate the power blocking signal when the call signal is received. According to the embodiment, the modem 13 may receive the sensing signal of informing of the call signal sensing from the transmitting unit 12 to generate the power blocking signal.

Meanwhile, when the call signal is not received, the mobile terminal 100 maintains the sleep mode. According to the embodiment, the sleep mode may signify that the mobile terminal 10 is operated in a mode except for the call mode.

In step S107, when the wireless power transmitter 200 receives the power blocking signal from the transmitting unit 12, the wireless power transmitter 200 blocks the power transmitted to the wireless power receiver 300.

If the mobile terminal 10 receives the call signal as described above, the power transmitted from the wireless power transmitter 200 to the wireless power receiver 300 may be blocked. Thus, when the mobile terminal 10 enters the call mode, the reception sensitivity is not deteriorated, so that a user may not feel displeasure.

Then, in step S109, the reception sensitivity measuring unit 15 measures reception sensitivity in the call mode.

In step S111, the modem 13 checks whether the measured reception sensitivity is equal to or more than the threshold sensitivity.

In step S113, if the reception sensitivity is equal to or more than the threshold sensitivity, the modem 13 may generate the power resuming signal. Then, the transmitting unit 12 may receive the power resuming signal so that the transmitting unit 12 may transmit the power resuming signal to the wireless power transmitter 200.

If the received reception sensitivity is less than the threshold sensitivity, the process returns to the step S107, so that the state of blocking the power transmission to the wireless power receiver 300 is maintained.

According to the embodiment, the threshold sensitivity is the minimum sensitivity necessary to maintain a normal call mode when the mobile terminal 10 enters the call mode, the threshold sensitivity may signify the minimum sensitivity that does not cause unpleasant feeling to the user. The threshold sensitivity may be set by a user or may be set as a predetermined value when the mobile terminal 10 is manufactured.

The power resuming signal may signify a signal for allowing the wireless power transmitter 200 to resume the power transmission to the wireless power receiver 300 after the power transmitted to the wireless power receiver 300 is blocked.

In step S115, when the wireless power transmitter 200 receives the power resuming signal, the wireless power transmitter 200 resumes the power transmission to the wireless power receiver 300.

Then, in step S117, the sensing unit 11 checks whether a call signal is not sensed so that the call mode is terminated.

When the call mode is terminated, the mobile terminal 10 returns to thee step S101 so that the mobile terminal 10 returns to the sleep mode. When the call mode is maintained, the mobile terminal 10 returns to the step S109.

Figure 8:
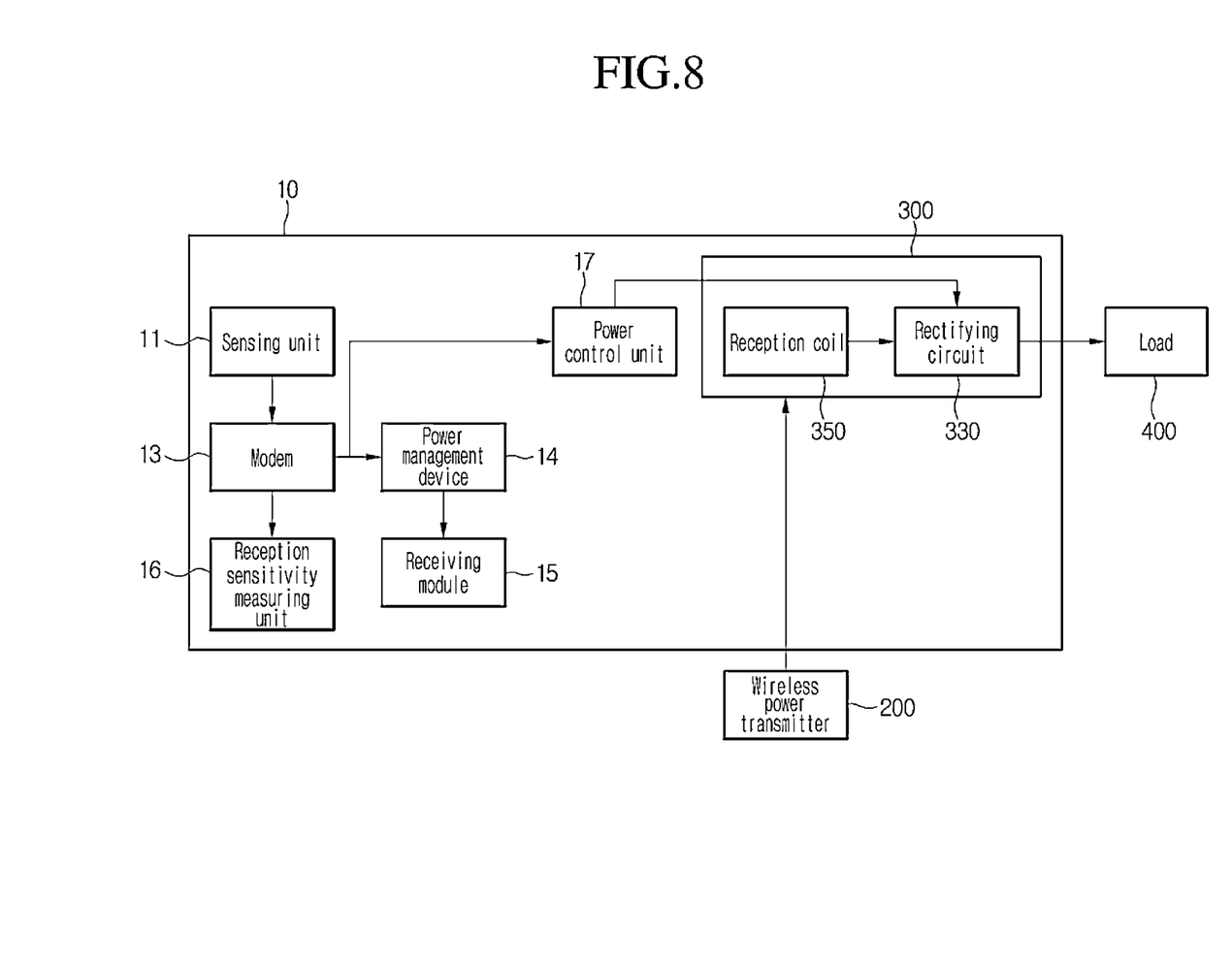
FIG. 8 is a block diagram showing a mobile terminal according to the second embodiment.

FIG. 8 is a block diagram showing a mobile terminal according to the third embodiment.

Referring to FIG. 8, the mobile terminal 10 according to the third embodiment may include a sensing unit 11, a modem 13, a power management device 14, a receiving module 15, a reception sensitivity measuring unit 16, a power control unit 17 and a wireless power receiver 300.

Since the functions of the elements except for the power control unit 15 are the same as those described in FIG. 5, the detailed description will be omitted below.

When the sensing unit 11 receives the call signal to transmit the call signal to the modem 13, the modem 13 may generate the wake up signal and then, may transmit the wake up signal to the power management device 14. The wake up signal may signify a signal for allowing the power management device 14 to transmit the power to the receiving module 15 so that the mobile terminal 10 normally maintains the call mode.

The modem 13 may generate the wake up signal and at the same time, the power blocking signal and may transmit the generated power blocking signal to the power control unit 17.

According to the embodiment, the power blocking signal may signify a signal for allowing the wireless power receiver 300 to block the power transmitted to the load 400.

The modem 13 may generate the power resuming signal. The power resuming signal may signify a signal for allowing the wireless power receiver 300 to resume the power transmission to the load 400 after the power transmitted from the wireless power receiver 300 to the load 400 is blocked. According to the embodiment, the power resuming signal may signify a signal generated when reception sensitivity, which is will be described below, is threshold sensitivity or more in a call mode.

After the power management device 14 receives the wake up signal from the modem 13 and enters the wake up state, the power management device 14 may provide the power to the receiving module 15. That is, when the mobile terminal 10 enters the call mode, the power management device 14 may provide the power necessary to start and maintain the call mode to the receiving module 15.

The power control unit 17 receives the power blocking signal or the power resuming signal from the modem 13, and may block the power transmitted from the wireless power receiver 300 to the load 400, or resume the power transmission.

When the power control unit 17 receives the power blocking signal from the modem 13, the power control unit 17 may control the rectifying circuit 330 to block the power transmitted to the load 400. The rectifying circuit 330 may include a switch connected in series to the rectifier, and the power control unit 17 may transmit an open signal to the switch to open the switch, so that the power transferred to the load 400 may be blocked. According to the embodiment, the switch may be included in not the rectifier but the reception coil 350, and the power control unit 17 may transmit the open signal to the switch so that the power transferred to the load 400 may be blocked.

The power control unit 17 may control the wireless power receiver 300 to block the power transferred to the load 400 by using various schemes as well as the above describe scheme.

As described above, when the mobile terminal 10 receives a call signal, the power transferred from the wireless power transmitter 200 to the load 400 through the wireless power receiver 300 may be blocked. Thus, when the mobile terminal 10 enters the call mode, the reception sensitivity of the mobile terminal 10 is not deteriorated, so that a user may not feel displeasure.

Figure 9:
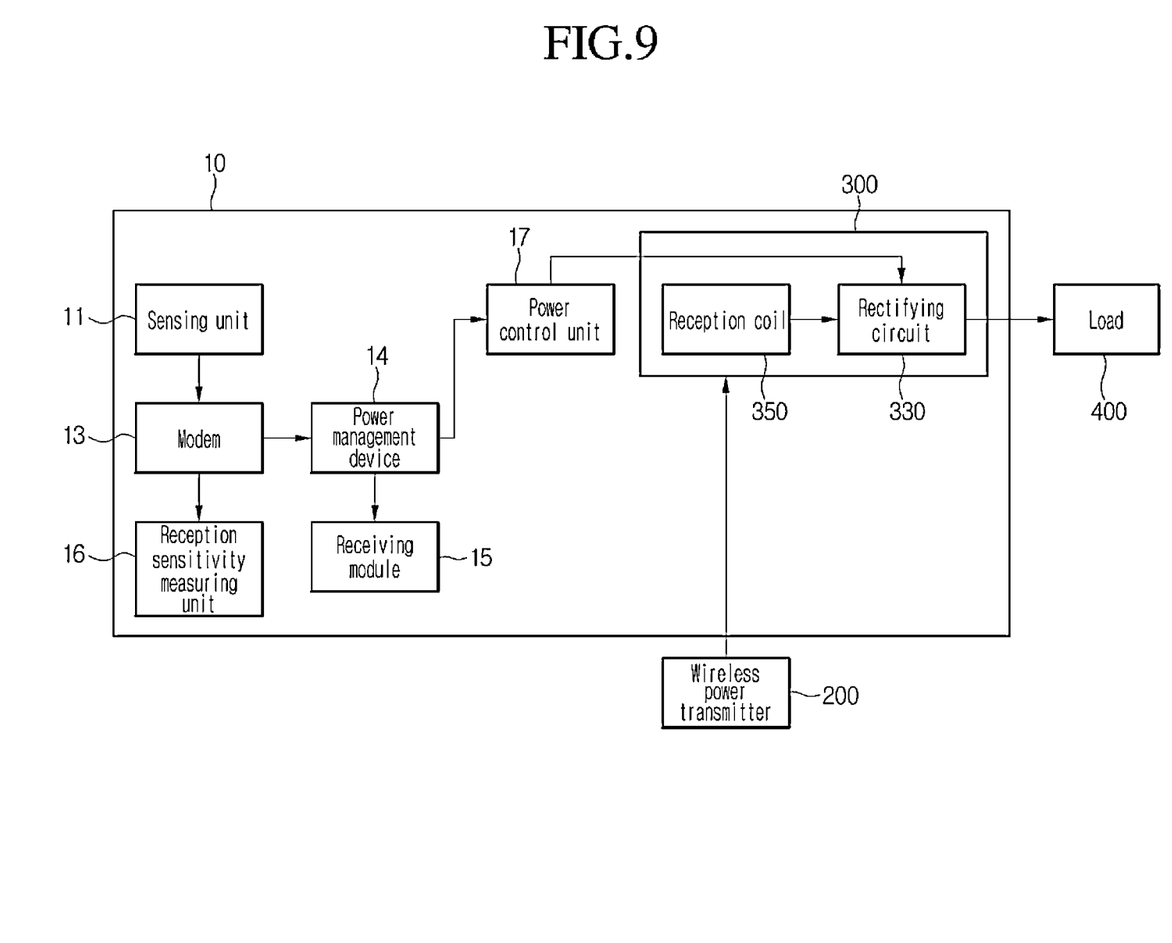
FIG. 9 is a block diagram showing a mobile terminal according to the second embodiment.

FIG. 9 is a block diagram showing a mobile terminal according to the fourth embodiment.

Referring to FIG. 9, the mobile terminal 10 according to the fourth embodiment may include a sensing unit 11, a modem 13, a power management device 14, a receiving module 15, a reception sensitivity measuring unit 16, a power control unit 17 and a wireless power receiver 300.

The sensing unit 11, the receiving module 15 and the reception sensitivity measuring unit 16 are the same as those described in FIGS. 5 and 8, and thus, the detailed description of them will be omitted.

When the sensing unit 11 receives the call signal to generate the wake up signal so that the generated wake up signal may be transmitted to the power management device 14. The wake up signal may signify a signal that allows the power management device 14 to provide power to the receiving module 15 such that the mobile terminal 10 may normally maintain the call mode.

That is, when the mobile terminal 10 enters the call mode, the power management device 14 may provide the power necessary to start and maintain the call mode to the receiving module 15.

The power management device receives the wake up signal from the modem 13 to enter the wake up state. Before the power management device 14 provides the power to the receiving module 15, the power management device 14 generates the power blocking signal and transmits the power blocking signal to the power control unit 17. According to the embodiment, the power blocking signal may signify a signal for allowing the wireless power receiver 300 to block the power to the load 400.

Then, the power management device 14 provides the power to the receiving module 15. That is, before the power management device 14 provides the power to the receiving module 15, the power control unit 17 allows the wireless power receiver 300 to block the power transferred from the wireless power receiver 300 to the load 400, so that the reception sensitivity of a call may be maintained in an optimum state. In more detail, before the power management device 14 provides the power to the receiving module 15, the power control unit 17 allows the wireless power receiver 300 to block the power transferred from the wireless power receiver 300 to the load 400, so that the deterioration of the reception sensitivity due to a magnetic field generated by the power transmission between the wireless power transmitter 200 and the wireless power receiver 300 may be inhibited. Therefore, the reception sensitivity is maintained in the optimum state.

A power transmission method of the wireless power receiver according to the disclosure may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

In the disclosure, the method of transmitting power through electromagnetic induction may signify tight coupling having a relatively low Q value. The method of transmitting power through resonance may signify loose coupling having a relatively high Q Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a receiving unit to wirelessly receive power from a wireless power transmitter; and
    a sensing unit to sense a call signal, wherein, when the call signal is sensed, the mobile terminal transmits a transmission power control signal, for controlling transmission power of the wireless power transmitter, to the wireless power transmitter;
wherein, when the call signal is sensed, the mobile terminal transmits a transmission power blocking signal for blocking the transmission power to the wireless power transmitter; and
wherein the mobile terminal transmits a transmission power resuming signal to the wireless power transmitter to resume the power transmission when the measured call reception sensitivity is equal to or more than a threshold value after the transmission power blocking signal is transmitted.

2. The mobile terminal of claim 1, further comprising:
a reception sensitivity measuring unit to measure call reception sensitivity of the mobile terminal.

3. The mobile terminal of claim 1, wherein the mobile terminal transmits the transmission power blocking signal to the wireless power transmitter when the measured call reception sensitivity is less than the threshold value after the transmission power resuming signal is transmitted.

4. The mobile terminal of one of claim 1, wherein the mobile terminal transmits a transmission power blocking signal for blocking the transmission power to the wireless power transmitter when the mobile terminal enters a call mode and call reception sensitivity of the mobile terminal is less than a threshold value.

5. The mobile terminal of claim 1, wherein the mobile terminal transmits the transmission power control signal to the wireless power transmitter by using in-band or out-of-band communication.

6. The mobile terminal of claim 1, wherein, after the call signal is sensed, the mobile terminal transmits the transmission power control signal to the wireless power transmitter depending on reception of a call starting instruction.

7. The mobile terminal of claim 6, wherein the mobile terminal transmits a transmission power blocking signal for blocking the transmission power to the wireless power transmitter when the call signal is sensed and the call starting instruction is received.

8. The mobile terminal of claim 6, wherein the mobile terminal transmits a transmission power maintaining signal for maintaining the transmission power to the wireless power transmitter when the call signal is sensed and the call starting instruction is not received.

9. The mobile terminal of claim 1, wherein the mobile terminal transmits a transmission power blocking signal for blocking the transmission power to the wireless power transmitter before the wake up signal is transmitted to the power management device.

10. A wireless power transmitter which wirelessly transmits power to a mobile terminal including a wireless power receiver, the wireless power transmitter comprising:
a power supplying apparatus to generate AC power; and
a transmission coil to wirelessly transmit the AC power to the mobile terminal;
wherein the wireless power transmitter adjusts transmission power of the wireless power transmitter, when information about a call is received from the mobile terminal;
wherein the wireless power transmitter blocks the transmission power when the call signal sensing information is received therein; and
wherein the wireless power transmitter resumes power transmission to the wireless power receiver when the reception sensitivity information is further received and call reception sensitivity checked through the reception sensitivity information is equal to or more than a threshold value.

11. The wireless power transmitter of claim 10, wherein the information about a call includes one of call signal sensing information, call starting information, reception sensitivity information and call termination information.

12. The wireless power transmitter of claim 11, wherein the wireless power transmitter blocks the transmission power when the call signal sensing information and the call initiation information are received therein.

13. The wireless power transmitter of claim 10, wherein the wireless power transmitter blocks again the power transmission when the checked call reception sensitivity is less than the threshold value in a state of resuming the power transmission.

14. The wireless power transmitter of claim 12, wherein the wireless power transmitter resumes transmitting the power to the wireless power receiver when the call termination information is received in a state of blocking the power transmission.

* * * * *